United States Patent [19]
Worden et al.

[11] Patent Number: 5,950,295
[45] Date of Patent: Sep. 14, 1999

[54] METHOD AND HINGE STRUCTURE FOR TEMPORARILY INSTALLING A DOOR WITH A VEHICLE FOR SUBSEQUENT REMOVAL FROM THE VEHICLE OR THE TEMPORARY CONNECTION OF A BODY HALF OF A HINGE WITH A DOOR HALF OF A HINGE AND FOR SUBSEQUENT SEPARATION OF THE HALVES

[75] Inventors: Scott David Worden, Willow Beach, Canada; Stephen Joseph Mitchell, Walled Lake, Mich.; Cheaw Wang Ng, Richmond Hill, Canada

[73] Assignees: Chrysler Corporation, Auburn Hills, Mich.; Multimatic, Inc., Unionville, Canada

[21] Appl. No.: 08/740,885

[22] Filed: Nov. 4, 1996

Related U.S. Application Data

[63] Continuation of application No. 08/195,460, Feb. 14, 1994, abandoned.

[30] Foreign Application Priority Data

Aug. 5, 1993 [CA] Canada ..................................... 2101981

[51] Int. Cl.⁶ .............................. B23P 17/00; B23P 19/02
[52] U.S. Cl. ............................. 29/423; 29/426.4; 29/458; 29/460; 29/527.2; 118/500; 427/289
[58] Field of Search ..................................... 29/423, 426.4, 29/458, 460, 527.2; 118/500, 503; 427/289, 421

[56] References Cited

U.S. PATENT DOCUMENTS 2,688,185   9/1954   Brazil et al. ........................ 29/426.4 X
4,627,166  12/1986   McMinn .............................. 29/426.4 X

*Primary Examiner*—Joseph M. Gorski
*Attorney, Agent, or Firm*—William J. Coughlin

[57] ABSTRACT

A method for temporarily connecting a body half and a door half of a hinge, said body half of said hinge including connecting means for receiving said door half of said hinge including connecting means for receiving the body half, one of said connecting means including a portion having disposed proximate the end thereof at least one groove for receiving a resilient flexible retainer;

said method including the steps of;

(a) fastening the hinge when assembled to a vehicle and a door so as to fasten the door with the vehicle temporarily;

(b) painting the vehicle and door together while temporarily connected;

(c) subjecting the vehicle and door and the resilient flexible retainer to heat such as that found in a curing process for a painting process for vehicles;

(d) separating said body and door halves of said hinge by removing the retainer and separating said halves;

(e) separating said door from said vehicle by separating the body half and the door half of said hinges.

2 Claims, 5 Drawing Sheets

METHOD AND HINGE STRUCTURE FOR TEMPORARILY INSTALLING A DOOR WITH A VEHICLE FOR SUBSEQUENT REMOVAL FROM THE VEHICLE OR THE TEMPORARY CONNECTION OF A BODY HALF OF A HINGE WITH A DOOR HALF OF A HINGE AND FOR SUBSEQUENT SEPARATION OF THE HALVES

This application is a continuation of application Ser. No. 08/195,460, filed Feb. 14, 1994 and now abandoned.

FIELD OF INVENTION

This invention relates to a hinge structure and methods for temporarily installing a vehicle door, with a vehicle body to allow for the painting of the door and the body, and the subsequent separation of the door and the body, prior to installation of heat sensitive hardware to be installed in the door. The method of this invention is accomplished by providing a unique hinge pin retainer with a hinge which temporarily allows for, the mounting of the door with the vehicle, and ease of removal of the retainer when the door is removed following the painting process.

BACKGROUND OF THE INVENTION

Figure 2:
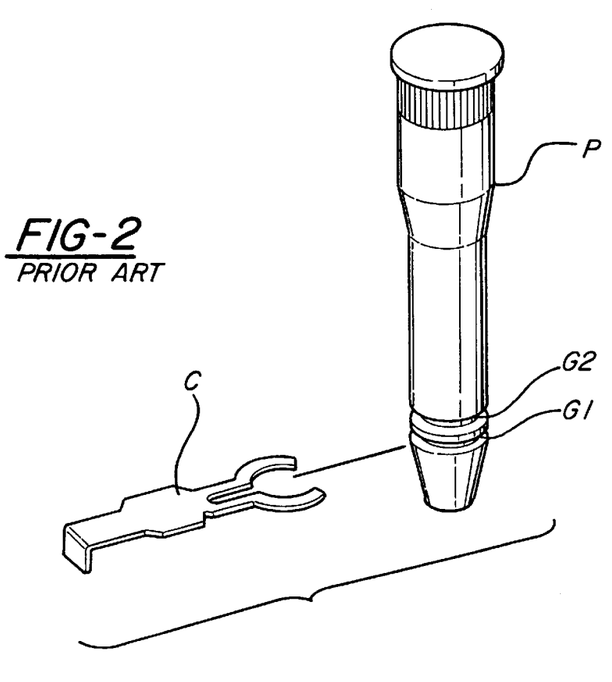
FIG. 2 is a prior art fastener or clip used in conjunction with a hinge pin.

It is well known in the art to provide a method of temporarily installing a door with a vehicle. However, such methods are normally effected by the installation of a clip with the hinge pin of the vehicle hinge to allow for removal of the clip and for separation of the door from the vehicle. For example, Honda has provided a vehicle having a hinge which has a door half and a body half. The door half and the body half are joined by a pin having a head and a tail. The head has vertically extending alternating grooves and ridges located adjacent a larger diameter shank than the shank located proximate the tail of the hinge pin. This hinge pin has located near the tail thereof two fairly deep grooves which extend about the circumference of the narrow diameter shank of the tail of the pin. A clip having a generally C-shape is provided which has an extension provided therewith accessible by a tool. The hinge half and door half are connected together thereby connecting the door with the vehicle temporarily, by clipping the generally C-shaped clip into the groove closest to tail end of the pin. By doing this, the alternating grooves and ridges do not bite into any metal portions extending about the hinge pin opening of the body half and therefore the hinge pin is not secured in its final position. Reference to FIG. 2 is made in this regard.

Once the vehicle body and doors are painted the generally C-shaped clip is removed to allow for the separation of the door half and the body half of the hinge. This clip and the removal thereof is quite time consuming as it is often coated in paint and difficult to remove and results in the permanent discard of the generally C-shaped clip.

Other methods have been contemplated as well. For example, Honda also has an apparatus for temporarily installing, and a method for temporarily separating a door, wherein one half of the hinge has provided therewith a bracket which contains the final metal ring fastening clip therewith. This fastening clip is driven by the insertion of the hinge pin into its final position, substantially as described and taught in U.S. Pat. No. 5,033,163, which specifically claims the inclusion of the hinge pin (as best seen in relation to FIG. 5 thereof) with the door half of a hinge assembly when shipped.

Other examples of methods are found in the following references.

A fastener is described in U.S. Pat. No. 2,165,504 at FIG. 30 which has essentially a truncated cone and a groove with the driving head at one end. U.K. Patent Application 2,055,958 also shows a similar type of fastener in FIG. 3a thereof.

Great Britain Patent Specification 1,295,023 published on Nov. 1, 1972, and referring to FIG. 8 thereof, there is disclosed a hinge pin which utilizes a groove at one end and head at the other, which is retained in position with a substantially C-shaped clip.

Great Britain Patent Specification 1,486,013 published Sep. 14, 1977 describes a barrel hinge having a pin which is fastened with the use of a groove with the retainer being a split ring.

Great Britain Patent Specification 1,128,015 published Sep. 25, 1968 teaches a pivot assembly which includes at one end a C-shaped retainer clip washer 15 which fits into a groove on the pin.

U.S. Pat. No. 1,175,550, issued Mar. 14, 1916, shows a single grooved pin with a retaining member as best seen in FIG. 4 which clamps under the shoulder 10d of FIG. 2 to retain the pin in its assembled position.

U.S. Pat. No. 2,246,359, issued Jun. 17, 1941, describes a link for engaging a groove in a pin.

U.S. Pat. No. 3,068,508, issued Dec. 18, 1962, includes an expanded portion near the head and a double grooved portion near the tail which has a broaching tool for use when inserted with the hinge.

U.S. Pat. No. 3,766,599, to Mullins Manufacturing Company, shows a hinge assembly, and specifically in FIG. 7 thereof a modified form of the pin used with the hinge which includes two grooves 128 and 132. Groove 128 is the desired location for retaining portion 130 of the sleeve, but should the manufacturing tolerances require, the supplementary position defined by groove 132 can be adopted during assembly as an alternate to the preferred groove 128. Therefore this reference teaches the use of a pin with a tapered end and having an expanded end near the head and two grooves near the tail or nose for use in a hinge. This patent was issued Oct. 23, 1973.

As seen in FIG. 11 of Honda's U.S. Pat. No. 5,123,148 there is shown a hinge pin with a single groove. The patent refers to a method and apparatus for feeding and installing hinge pins, by which a door will be coupled.

Nowhere within the prior art is there provided a method for temporarily fastening a door half and a body half of a hinge together, utilizing a flexible ring, which remains flexible at ambient temperatures, but in one embodiment becomes brittle once exposed to the heat typically found in a drying process following the painting of a vehicle. In another embodiment the retainer remains flexible for ease of use. The retainer ring is designed to provide ease of removal when subsequently separating the door from the vehicle.

It is therefore a primary object of the invention to provide a method and hinge which is more simpler to utilize.

It is also an object of the invention to improve the design of hinge pins and retainers in combination.

Further and other objects of the invention will become apparent to those skilled in the art when considering the following summary of the invention and a more detailed description of the preferred embodiments illustrated herein.

SUMMARY OF THE INVENTION

According to a primary object of this invention there is provided a method for temporarily connecting a body half and a door half of a hinge, said body half of said hinge including connecting means for receiving said door half of said hinge further including connecting means for receiving the body half, of said hinge, one of said connecting means including a portion having disposed proximate the end thereof at least one groove for receiving a resilient flexible retainer;

said method including the steps of;
(a) fastening the hinge when assembled to a vehicle and a door so as to fasten the door with the vehicle temporarily;
(b) painting the vehicle and door together while temporarily connected;
(c) subjecting the vehicle and door and the resilient flexible retainer to heat such as that found in a curing process for a painting process for vehicles;
(d) separating said body and door halves of said hinge by removing the retainer and separating said halves;
(e) separating said door from said vehicle by separating the body half and the door half of said hinges.

In one embodiment the body half of said hinge includes connecting means further comprising openings within which connecting means further comprising pin like portions extending from said door half are inserted, said pin like portions having a groove disposed proximate the end thereof wherein said resilient retainer will reside for temporarily fastening of said body half and said door half.

In another embodiment said connecting means of said body and door halves including openings through which a separate hinge pin is inserted. Preferably the hinge pin includes at least two and preferably four grooves including a first and third groove having substantially the same diameter and a second and fourth groove having substantially the same diameter but different from the diameter of the first and third groove. Preferably the first and third groove have a diameter larger than the second and fourth groove, each groove having a leading wall being substantially normal to the extension of said pin and having a trailing wall disposed substantially at an angle of 60° to the first wall.

According to another object of the invention there is provided a method for temporarily connecting a body half and a door half of a hinge, said body half of said hinge including connecting means (such as an opening extending therethrough for receiving a hinge pin), said door half of said hinge including connecting means, (such as an opening extending therethrough for receiving a hinge pin), the connecting means for connecting said hinge halves, and when present said hinge pin including a head end and a tail end, one of said connecting means (and if a hinge pin is used said tail end thereof) having disposed therewith at least one groove for receiving a resilient flexible retainer;

said method comprising the steps of;
(a) connecting the body half and the door half of the hinge with a resilient flexible retainer, and preferably polyester or nylon ring, retained in said at least one groove; said retainer remaining flexible at all temperature ranges if for example polyester or the like is used or if for example nylon or the like is used, being flexible at normal ambient temperatures but becoming brittle and friable when subjected to extreme heat, such as the heat found in a curing process for painting automotive vehicles;
(b) painting the vehicle and door together while temporarily connected;
(c) subjecting the vehicle and door and the resilient flexible retainer to heat such as that found in a curing process for a painting process for vehicles;
(d) removing said hinge pin from said body and door halves of said hinge by removing (for example shearing) said retainer if polyester is used or by shattering the now brittle and friable nylon retainer if present and disconnecting said hinge halves, for example by removing said pin; (preferably said removal, shearing or shattering being accomplished by an air tool or robotic, by for example impact);
(e) separating said door from said vehicle by separating the body half and the door half of said hinges.

In a preferred embodiment the following steps are added to the method;
(f) mounting the necessary hardware in the vehicle and in the door while the door is separated from the vehicle;
(g) reinstalling said door with said vehicle by re-aligning the connecting means of the hinge halves and if present the openings of said hinge halves and connecting said hinge halves by for example preferably inserting said hinge pin into said hinge openings, preferably to allow for the biting of vertically extending alternating grooves and ridges adjacent the head of said pin into the material surrounding the appropriate openings, of said half of said hinge and securing a metal ring clip in the final securing groove of said tail end of said hinge pin.

In a preferred embodiment of the method the hinge pin used in conjunction with the method has at least two grooves provided therewith. The first groove is located nearest the tail end of the hinge pin with a second groove located further along the shank of the hinge pin adjacent the first groove. The first groove is used for securing the temporary resilient flexible retainer of the method and the second groove is used in conjunction with the biting alternating ridges and grooves located adjacent the head of an expanded shank portion of the hinge pin.

In another embodiment of the method there is provided more then two grooves with the hinge pin to allow for variances in manufacturing tolerances of the hinges, the hinge pillars, and the doors. For example, a retainer or clip having a generally ringed shape is provided that clips into any of the successive grooves provided, so long as pressure is exerted on the clip, the ringed shape clip having an interior diameter and an exterior diameter and having disposed adjacent the interior diameter an opening about which are disposed means to prevent removal of the clip, when installed on the hinge pin, toward the tail of the hinge pin from the specific groove in which the clip is installed, but allowing the movement of the clip to the next successive groove away from the tail, if pressure is exerted to do so, until the clip won't move to the next successive groove or reaches the last groove thus thereby providing with the multiplicity of grooves allowance for tightening of the hinge pin to the point of maximum securing thereof.

In another embodiment of the invention there is provided a hinge pin having a tail and a head and having disposed proximate the tail, a series of more than two grooves disposed in a progression towards to the head of the hinge pin for use in securing a generally circular ring shaped clip having an inner and outer diameter and having disposed proximate the inner diameter an opening about which opening are disposed means for preventing the removal of the clip toward the tail of the hinge pin and yet allowing the clip to move up to the next successive groove of the hinge pin as pressure is exerted to do so. In providing such a hinge pin it is possible to tighten a hinge pin within a hinge body to the maximum amount. For example, knowing that the manufacturing tolerances from mounting a door upon a vehicle might be plus or minus 0.035 inches, for example, it is possible to allow for play 0.070 inches. If the grooves were set out at intervals of predetermined amounts to allow for the tightening of the hinge pin with the hinge body, for example the body half and the hinge half, then in spite of the variances of manufacture from vehicle to vehicle the hinge could still be secured properly during final assembly. Further by providing such a hinge pin design, it will function with more then one hinge half and body half design.

According to yet another preferred embodiment the resilient flexible retainers are provided as portions to be punched out of a continuous flexible (preferably strip) matrix containing the scored outline of the retainers to be punched out by an operator as required. The matrix may be preferably made from nylon, mylar, or other polyester.

According yet to another aspect of the invention there is provided a hinge comprising a body half and a door half linked together by connecting means and preferably by a hinge pin, the hinge pin having two ends having disposed proximate one end means to drive the hinge pin into openings for receiving the hinge pin disposed with the body half and the door half the connecting means, and when used the hinge pin, having disposed proximate the end thereof at least one groove wherein is contained in use a resilient flexible preferably polyester or nylon, retainer which is preferably a ring, the retainer being made from a material which is resilient and flexible at all temperatures such as polyester, or a material which remains resilient and flexible at ambient temperatures and which becomes brittle and friable at hotter temperatures, such as those found within the curing process of painting vehicle. Preferably two grooves are provided proximate the end of the connecting means and when used the pin having at least one groove. In one embodiment the hinge pin is temporarily removably attached to the body half and the door half and connected together with the resilient flexible retainer, for example for shipping to the vehicle manufacturer, the resilient retainer being located in the outer first groove of more than one groove provided with the hinge pin. In another embodiment the grooves provided with the connecting means or hinge pin are rolled when formed and are shallower in depth than other known structures, for example 0.54 mm for the final groove and 0.96 mm for the temporary groove.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

It is known in the prior art as described in the background of the invention to provide the removal of a door of a vehicle, at specific times during the manufacture of the vehicle. For example, typically because a vehicle door contains hardware such as the interior trim, handles, glass, window regulator, speakers and padding for comfort of the occupant, which devices are not designed to endure the heat extremes of a painting process, they are therefore installed after the vehicle and door are painted. The door therefore is normally located on the vehicle temporarily by joining a body half of a hinge and a door half of a hinge with a hinge pin and retainer, so as to simplify as much as possible the removal of the door from the vehicle once the door and vehicle are painted. During the painting process of course, the inside and outside of the door and hinges are painted with the vehicle. The vehicle is then taken through a drying process where the paint is cured by heat. Typically then the door is removed from the vehicle by removing the hinge pin as found in relation to FIG. 2, by removing the clip from the groove G1 of the pin P. The groove G1 is the temporary mounting position of the hinge pin P. Unfortunately, because of paint collecting around the C-shaped clip and in the groove G1 it may be difficult to remove the clip from the groove and hence the pin from the door half and body half of the hinges. It is therefore desirable to improve the separation of the hinge pin from the hinge halves.

Figure 1:
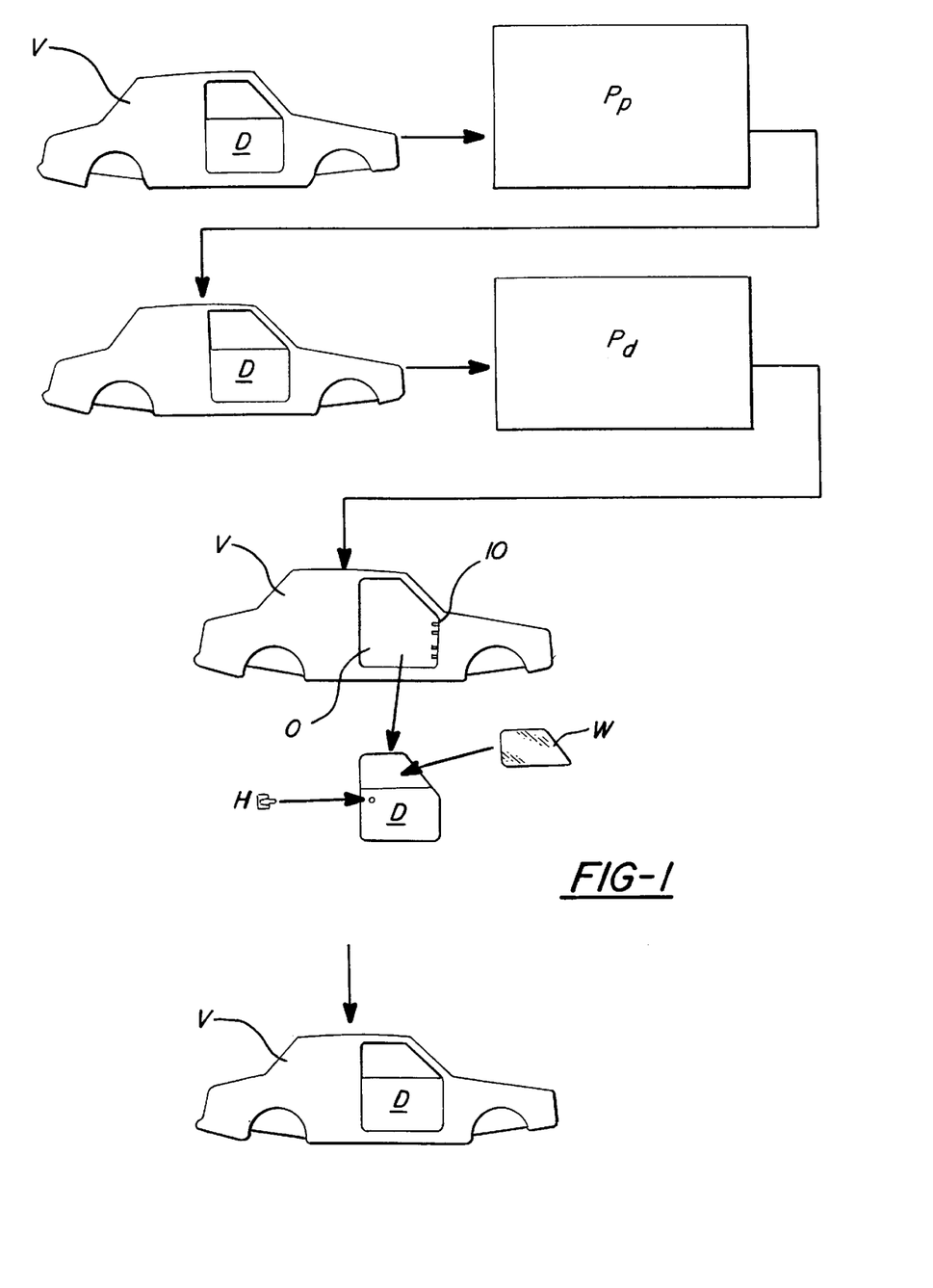
FIG. 1 is a schematic view of the movement of a vehicle through a painting process illustrated in a preferred embodiment of the invention.
Figure 4:
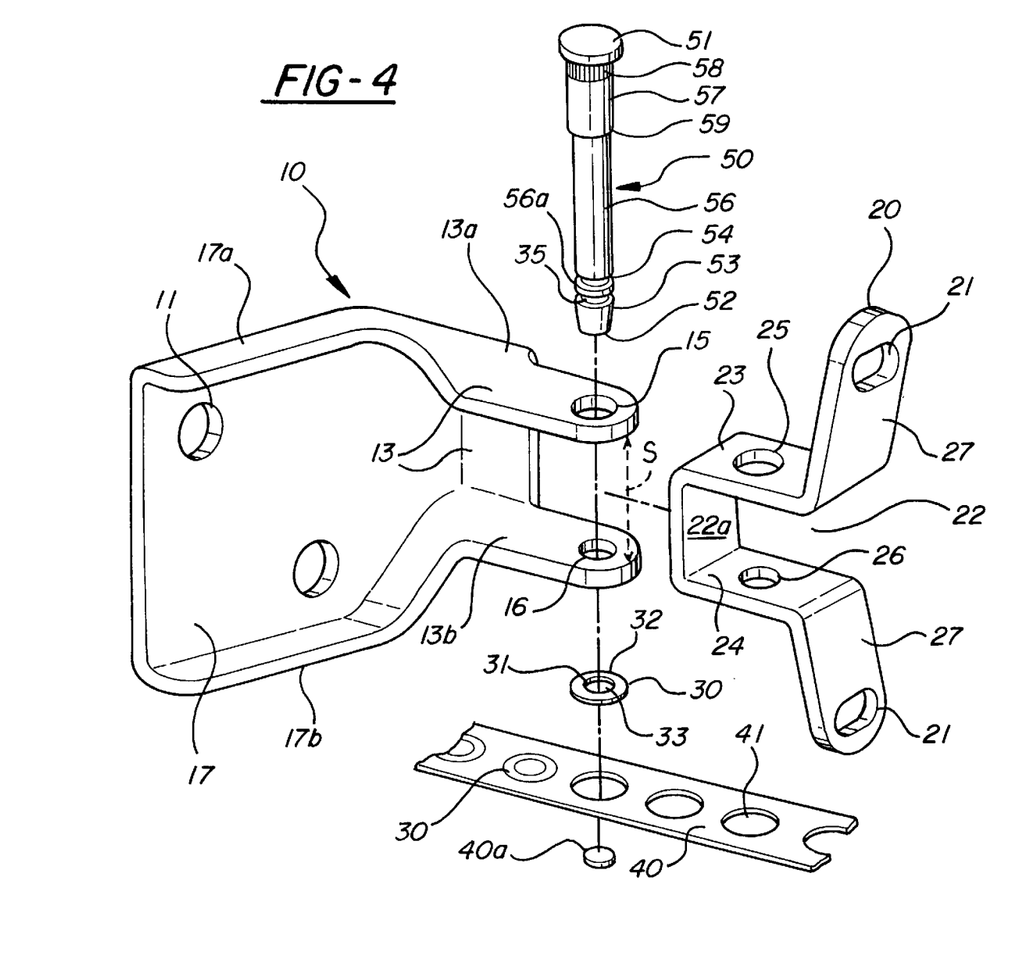
FIG. 4 is a exploded perspective view of the hinge utilized with the door of FIG. 3 illustrated in a preferred embodiment of the invention.
Figure 5:
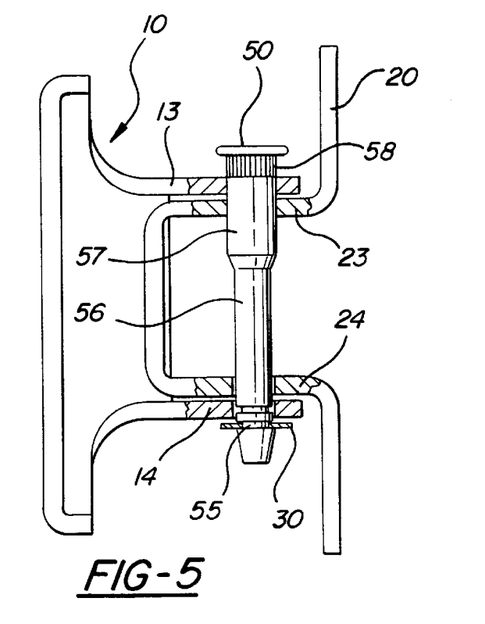
FIG. 5 is a side view of the hinge of FIG. 4 when assembled in a temporary position wherein the door is removable from the vehicle and illustrated in a preferred embodiment of the invention.

Referring now to FIG. 1, there is illustrated in general, and admittedly an over simplified description, a painting process for a vehicle V having mounted on temporarily a door D by using the hinge assembly as illustrated in FIG. 4. The vehicle therefore moves through the painting process $P_p$ and is thoroughly painted by known techniques and equipment. This of course occurs with the door D affixed to the vehicle V temporarily, as best seen in FIG. 5. The hinge is received assembled and merely mounted on the door of the vehicle. The vehicle then passes from the painting process to the paint drying process $P_d$. The drying and coating of the paint occurs in known techniques with known equipment. The vehicle then passes on through to the stage where the door D is removed from the vehicle V, so that the door is totally removed from the door opening O and from the body half hinge portion 10 which remains installed on the vehicle V. The door then typically has the hardware mounted therewith separate from the vehicle such as window W and handle H, until such a time as the vehicle moves to the assembly stage whereat the door D is reinstalled within the opening O, having had all of the hardware mounted in the door and in the vehicle. Those skilled in the art will appreciate that FIG. 1 is very much simplified from that which actually takes place but, emphasis is being made on the removal of the door and that stage of the process, and the reinstallation of the door using the same hinge and hinge pin, by using unique retainers in combination with a hinge pin which will be described hereinafter.

Figure 3:
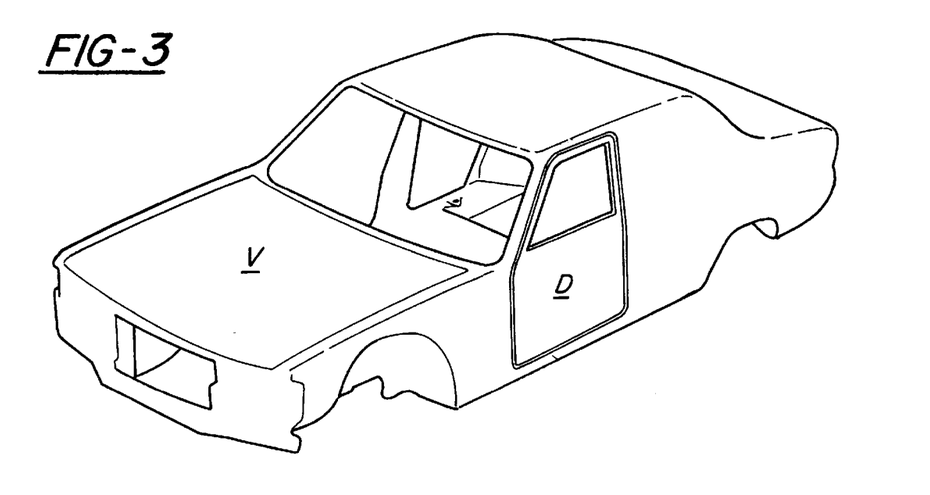
FIG. 3 is a close-up view of a door installed on a vehicle as it is moved through the process of FIG. 1.
Figure 6:
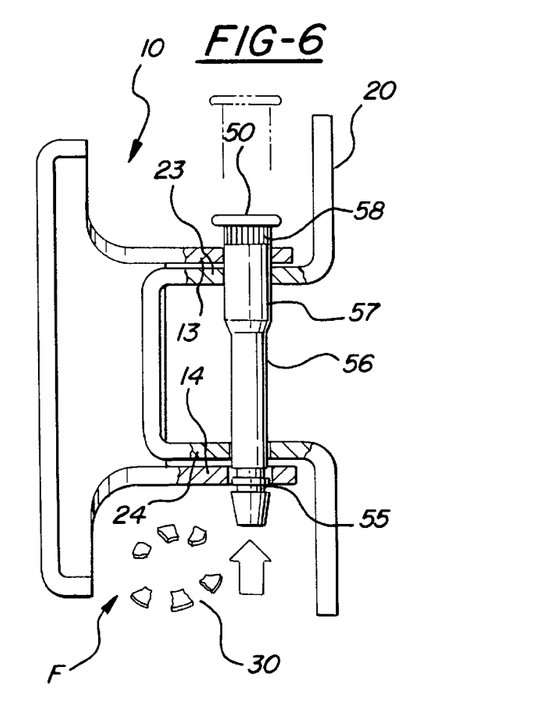
FIG. 6 is identical to the view of FIG. 5 with the exception that the resilient flexible retainer has become friable and is easily shattered following subjecting the entire vehicle to the drying process, and illustrated in a preferred embodiment of the invention.
Figure 8:
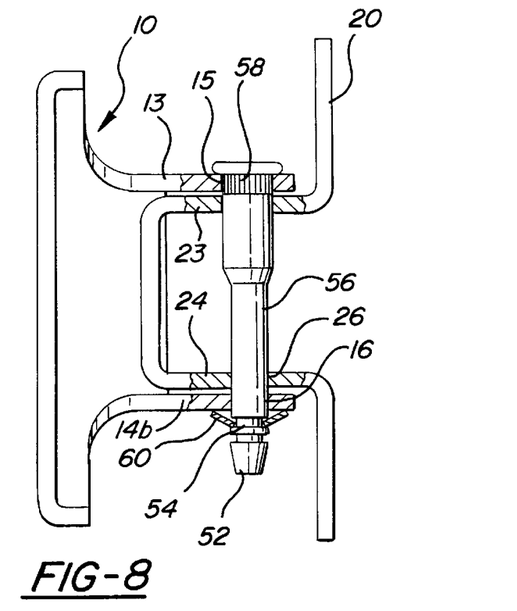
FIG. 8 is a view similar to that of the previous three Figures with the exception that the retaining member is installed in the final position and illustrated in a preferred embodiment of the invention.

Referring now to FIGS. 3 in conjunction with FIG. 1, there is illustrated a skeleton of a vehicle, just prior to painting with the door D installed in its normal location upon the vehicle V. Therefore as seen in FIG. 4, the hinge which includes the body half 10 and the door half 20 of the hinge 5 are installed as assembled upon the door and upon the vehicle respectively. The assembly may take place off site whereat the openings 15 and 16 of the body half are aligned with the openings 25 and 26 of the door half, allowing for insertion of the hinge pin 50 through the openings, to a point wherein a flexible resilient retainer 30 is installed within groove 55 of the hinge pin 50. The hinge is therefore received in a ready to use state. Therefore the door in FIG. 3 is temporarily mounted in its position to allow for the painting process of the vehicle to take place, without the hinge being installed in its final installation position, as best seen in FIG. 8. The door therefore will be painted along with the vehicle and the resilient flexible ring 30 will be painted as well along with the hinge components. As best seen in FIG. 6, because of the heating that takes place during a curing process $P_d$ of FIG. 1, the flexible resilient ring 30 if made from nylon becomes brittle and friable to allow for its removal when during the next stage in FIG. 1 the door must be removed from the vehicle. If polyester is used the ring remains flexible and easy to remove with the help of an appropriate tool.

Referring now more fully to FIG. 4 there is provided a body half 10 of a hinge having two arms generally extending away from one another at about a right angle. Within the first arm 17 of the body half 10 there is provided mounting openings 11 which accept fasteners to fasten the body half of the hinge 10 to a hinge pillar. The first portion 17 is rigidified by the flange 17a for mounting on a vehicle hinge pillar, extending generally at a right angel from the first portion 17 is a second portion 13 which includes extensions of the laterally extending flanges 17a numbered as 13a, within which are disposed two openings 15 and 16. The diameter of opening 15 is larger then the diameter of the opening 16 because of the dimension of the hinge pin, which will be described hereinafter. The opening 15 is provided within the laterally extending flange 13a which is an extension of the flange 17a and the bottom flange 13b is an extension of the flange 17b within which near the end thereof is disposed opening 16. The separation S between the inside surfaces of flanges 13a and 13b are separated by a predetermined distance to allow for insertion of a generally rectangular portion 22 of the door half 20 of the hinge 5.

The door half of the hinge 20 therefore is a continuous strip of material which is bent substantially as shown in FIG. 4, and which includes two ends 27 containing openings extending therethrough 21, which allow for the mounting of the door half of the hinge on the door of the vehicle. The arms 27 therefore are connected by a generally rectangular portion 22 which includes two generally horizontally extending portion 23 and 24 interconnected by a rectangular portion 22a of the generally rectangular portion 22. Disposed within the upper horizontal portion 23 and the lower horizontal portion 24 are openings 25 and 26. The diameter of opening 25 is larger then the diameter of opening 26. Of course the openings 25 and 26 are aligned so that when the portion 22 is inserted within the space S so as to align opening 25 and 15 and 26 and 16, the pin 50 may be inserted through the aligned openings, as best seen in FIG. 5.

Figure 10:
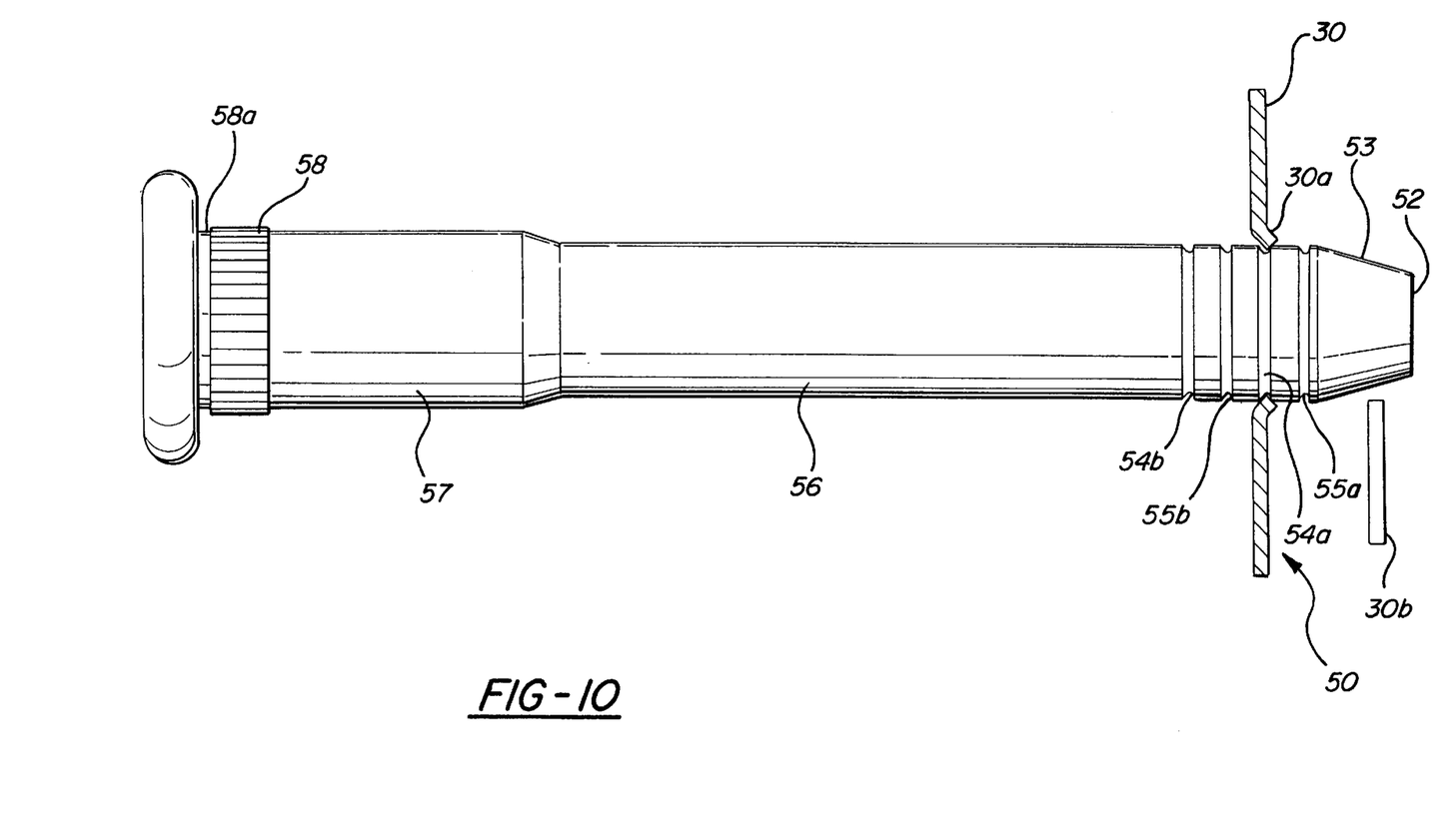

The hinge pin 50 is provided having two ends. A head 51 is provided at one end and a tail 52 is provided at the other end. An alternating number of grooves and ridges 58 extend about an enlarged shank diameter 57 proximate the head 51 of pin 50. The enlarged shank extends to a shoulder 59 whereat the diameter of the pin is reduced to a diameter of the shank portion 56 of the pin 50. Located near the terminus of the shank portion 56 adjacent the tail end 52 of the hinge pin 50 are two grooves 54 and 55 which have again a reduced diameter. A ring portion 56a separates the two grooves 54 and 55. Adjacent the tail end 52 of the hinge pin 50 is a truncated tapered cone 53, which allows for ease of installation of both the temporary retaining ring 30 and the final retaining clip 60 within either groove 55 or 54 respectively. Groove 55 is deeper than groove 54 in the preferred embodiment as best seen in FIG. 10.

The resilient flexible ring 30 is made from a flexible plastic material, such as nylon or polyester and has a opening 33 extending to the center thereof. Therefore, a first diameter of 12 mm on the outside of ring 30 is provided labeled 32, and a inner diameter of 7 mm proximate the opening 33 of ring 30, labeled as 31, is also provided. The diameter 31 is sufficient to allow for installation of the ring over the truncated cone 53 into groove 55 of the hinge pin 50 which has a depth of 0.96 mm, without excessive effort and that the ring is flexible and resilient, yet strong enough to retain the binge pin in its temporary fixed position as best seen in FIG. 5. When the resilient ring is installed the diameter 31 tends to roll over to further enhance the use of the ring as a retainer.

Referring now to FIGS. 5 through 8 the hinge pin has now been installed as seen in FIG. 5 and as described in relation to FIG. 4. The hinge assembly therefore is painted along with the vehicle, as described in relation to FIG. 1 and in relation to FIG. 3. It is now desirable following the drying stage of the vehicle to remove the vehicle door D from the vehicle V, as seen in the third stage of FIG. 1. The resilient plastic ring in one embodiment is selected from materials such as nylon which are resilient and flexible at normally ambient temperatures but which become brittle and friable at temperatures typically found in the drying process of a painting process for vehicles. In another embodiment the resilient ring is made from polyester which remains flexible at all temperatures. Polyester also withstood the environment of 400° F. typically found in a painting process. Therefore as best seen in FIG. 5, the door will be maintained in position by the flexible retainer 30 installed in groove 55 through the painting process, as seen in FIG. 1, and through the drying process as seen in FIG. 1 as well. During that process the flexible resilient ring 30 will be subjected to the heat normally found in the drying process of 400° F. for painting vehicles. Once therefore the door reaches the third stage of FIG. 1, it would be desirable to remove the door. To facilitate this step one merely removes the ring 30 via Force F using a robot or manual procedure with an air tool, which thereafter allows for simple removal of hinge pin 50 in the direction as shown in FIG. 6. If nylon is used the retainer will tend to be brittle and friable and shatter. If polyester is used the tool will assist its shearing.

The vehicle thereafter has all of the necessary components installed therewith as does the door, until such time as general indicated in FIG. 1 it is desirable to mount the door with the vehicle, whereat the same hinge pin is reinstalled through openings 15 and 25 and through openings 26 and 16. The openings 15 and 25 therefore accept the larger shank diameter 57 of hinge pin 50 and the bottom openings 26 and 16 accept the smaller diameter shank portion 56 of hinge pin 50. The head 51 of hinge pin 50 is therefore driven to be adjacent to the flange 13a of the body half 10 of the hinge, so that the alternating grooves and ridges extending about the enlarged shank diameter 57 of hinge pin 50, bite into the material surrounding the opening 15 of body half 10. In doing that the hinge pin is also designed to expose groove 54, having a smaller depth then groove 55, below the opening 16 of the body half 10 of the hinge 5. A retaining ring 60 made of spring steel therefore is provided having a opening 64 disposed through the center thereof and having an inner diameter 62 and an outer diameter 61. Located proximate the inner diameter 62 are retaining portion 63 which are formed by providing slots 65, extending from the inner diameter 62 toward the outer diameter 61 which will allow for the flexing of portion 63 in an outward direction toward the tail 52 of the hinge pin, as best seen in FIG. 8, but which will prevent the movement of the retainer 60 toward the tail end of the pin 52 once installed. The retainer 60 is therefore pressed onto the truncated cone portion 53 of the pin to the point whereat the retainer 60 rests within groove 54 adjacent the outer surface of flange 13b of the body half 10 of the hinge 5. The pin therefore is in its final location and the door is permanently installed on the vehicle.

Figure 7:
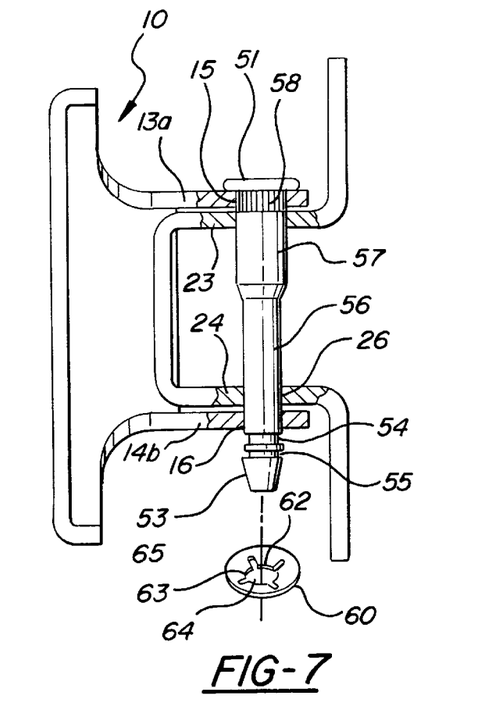
FIG. 7 is a view identical to FIGS. 5 & 6 with the exception that the hinge pin is located in its final permanent location, prior to a retainer being installed in the final retaining groove and illustrated in a preferred embodiment of the invention.
Figure 9:
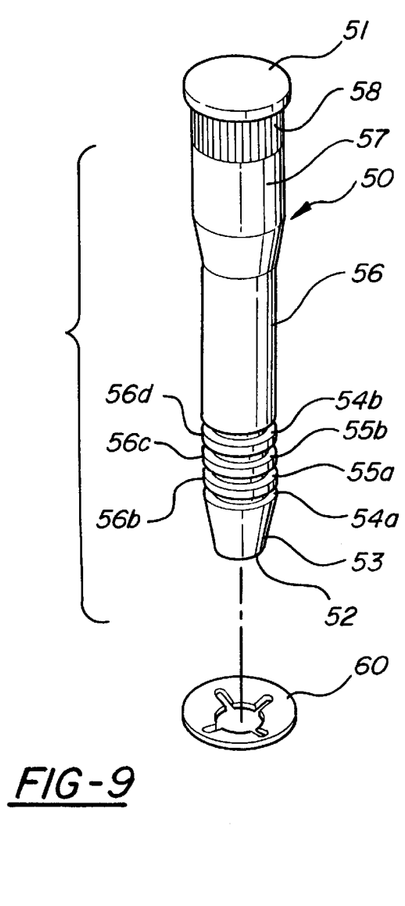
FIGS. 9 and 10 are illustrations of a unique hinge pin design in combination with a retainer, which allows for movement of the retainer under pressure to a secured position, while preventing the retainer from being removed, from any of the pre-defined positions, in a direction toward the tail end of the hinge pin and illustrated in a preferred embodiment of the invention.

Alternatively, the hinge pin such as that shown in FIG. 9 may be provided with the retainer 60 having grooves 54a, 54b, 55a and 55b separated by ring portions 56b, 56c and 56d and being substantially of the same diameters as the different grooves 54 and 55 so that when the hinge pin is installed as shown in FIGS. 6, 7 and 8, the retainer 60 will move to the highest accessible groove based on the pressure applied. This allows for the use of the hinge pin with different body and door halves. For example, if groove 54b were exposed instead of groove 54 as seen in FIG. 7, then the retainer 60 is designed so that it will move from groove 54a to 55a to 55b to 54b because of the bias shown as best seen in FIG. 8, but the portions will not flex in the opposite direction to allow for removal of the retainer. This adjustability therefore is provided to allow for variances in manufacturing tolerance which vary from vehicle to vehicle as a result of installation of a hinge including a body half and a door half and the painting thereof and accumulation of paint thereon and the variation in sizes of door halves and body halves. Therefore the grooves are provided to allow for these variances and still provide for a snug fit of the permanent installation of the door half and the body half of the hinge by the unique pin design.

As best seen in FIG. 4 the flexible resilient retainer rings 30 are provided on a matrix 40 made from nylon, or polyester which is a continuous strip wherein the rings are conveniently punched out of the strip 40 when the hinge is assembled. The strip therefore provides from automation techniques which much simplify the installation of the retainer on the hinge pin 50 wherein as the matrix 40 is moved toward the tail end 52 of the hinge pin 50, or vice versa, the tail end 52 of the hinge 50 will punch out the central portion 40a thereby leaving the retaining ring 30 in position in the groove 55 of hinge pin 50. The matrix 40 may therefore be continuous and fed from a magazine of a robot, or it may be utilized manually. Any suitable material may be used for selecting the matrix 40 and ring 30 so long as the material is sufficiently thick to withstand the forces applied upon retaining ring 30 when it is temporarily installed within groove 55, and so that it with stands easily the temperatures found within the drying process of a painting process.

It is preferred that the retaining ring be manufactured from MYLAR (a registered trademark) which is retained in a groove which is wider and deeper than the spring steel nut, so as to create the sought for shearing of the plastic retainer when the door and vehicle are separated following painting.

As best seen in FIG. 10, this will allow ease of removal of the polyester retaining ring from the groove 55b following the painting and drying process. The reader is to surmise that all grooves within all of the drawings with the exception of the drawings referred to as prior art, that is FIG. 2 are constructed preferably as shown in FIG. 10. For example, if the plastic ring 30 disposed at position 30b is slipped on to the end of the tapered cone 53 it will flex toward the cone when it adopts the position in the groove as shown. The flexing portion 30a will further inhibit the removal of the plastic retainer from that groove. The tapered following edge a of the groove will allow for ease of removal of the retainer once it is desired to separate the door from the vehicle. The same tapered head 53 will assist in using the permanent retainer 60 shown in a position actually outside of the groove to illustrate that the retainer as is known in the art will adopt a position in or outside of the groove, since it is made from spring steel and is a standard size push nut used in industry, whose edges as best seen in FIGS. 8 and 9 will bite into the perimeter of the shank portion 56 with or without a groove and act as a retainer. The sloped rear wall a of each groove therefore provides also for the easy movement and positioning of the spring steel retainer 60 to its final retained position.

By providing a hinge pin 50 as shown in FIGS. 9 and 10, the same hinge pin may be used for various sizes of door and body halves with equal success. Therefore a standard sized hinge pin having a multiplicity of grooves beyond four as shown in FIG. 10 would equally exploit the benefits of the present invention. The grooves 55b and 54b, 54a and 55a are formed by rolling unlike the prior art grooves of FIG. 2 which are formed by cutting. This rolling process increases the life of the tools required to do the rolling and therefore provides a more economical hinge pin design.

Therefore by supplying a hinge already temporarily connected as described above, the vehicle manufacture simply assembles the door with the vehicle and continues affecting the method of the present invention, as described above.

Disposed proximate the head of the hinge pin are the alternating ridged portions which have a full narrow at 58, as shown in FIG. 10.

As many changes can be made to the preferred embodiments of the invention without departing from the scope of the invention; it is intended that all material contained herein be interpreted as illustrative of the invention and not in a limiting sense.

The embodiments of the invention in which an exclusive property or privilege is claimed are as follows:

1. A method for processing a vehicle body and a door attached thereto, comprising the steps of:

providing a vehicle body having a body hinge portion defining at least one opening;

providing a door having a door hinge portion defining at least one opening;

providing a hinge pin having a head at one end thereof and at least two circumferential grooves near a second end thereof;

providing a resilient flexible nylon ring;

aligning said at least one opening of said body hinge portion with said at least one opening of said door hinge portion; then passing said hinge pin through said at least one opening of said body hinge portion and said at least one opening of said door hinge portion, such that said openings are located axially between said head and said at least two circumferential grooves;

placing said resilient flexible nylon ring in the one of said at least two circumferential grooves that is nearest said second end, thereby hingedly connecting said door to said vehicle body; then coating said vehicle body and said door with paint while said door and vehicle body remain hingedly connected; then heating said vehicle body, door and resilient flexible nylon ring, thereby curing said paint and rendering said nylon ring brittle; then shattering said brittle nylon ring and removing said hinge pin from said at least one opening of said body hinge portion and said at least one opening of said door hinge portion, thereby disconnecting said door from said vehicle body; and then moving said door relative to said vehicle body, thereby separating said door from said vehicle body.

2. The method of claim 1 further comprising performing the following steps after said moving step:
(f) mounting necessary hardware in the vehicle body and in the door while the door is separated from the vehicle body; and
(g) hingedly connecting said door with said vehicle body by re-aligning the openings of said hinge portions and inserting said hinge pin into said hinge openings and securing a metal ring clip in said groove nearest said second end of said hinge pin.

* * * * *

UNITED STATES PATENT AND TRADEMARK OFFICE
CERTIFICATE OF CORRECTION

PATENT NO : 5,950,295
DATED : September 14, 1999
INVENTOR(S): Scott D. Worden, et al.

It is certified that error appears in the above-identified patent and that said Letters Patent is hereby corrected as shown below:

Item 75, line 3, the third inventor's name, please delete "Cheaw" and insert --Chean--

Signed and Sealed this

Twenty-seventh Day of February, 2001

*Attest:*

NICHOLAS P. GODICI

*Attesting Officer*     Acting Director of the United States Patent and Trademark Office